United States Patent [19]

Heitmann

[11] 4,243,135
[45] Jan. 6, 1981

[54] APPARATUS FOR INSERTING PACKS INTO THE GAPS OF A MOVING FILE OF CIGARETTE PACKS OR THE LIKE

[75] Inventor: Bob Heitmann, Hamburg, Fed. Rep. of Germany

[73] Assignee: Hauni-Werke Körber & Co. KG., Hamburg, Fed. Rep. of Germany

[21] Appl. No.: 5,323

[22] Filed: Jan. 22, 1979

[30] Foreign Application Priority Data

Feb. 1, 1978 [DE] Fed. Rep. of Germany ....... 2804230

[51] Int. Cl.³ ............................................ B65G 47/10
[52] U.S. Cl. ................................... 198/370; 198/448; 198/451
[58] Field of Search ............... 198/347, 356, 358, 366, 198/370, 448, 451, 357, 456, 457, 490; 414/37; 221/14, 110, 123, 131, 253

[56] References Cited

U.S. PATENT DOCUMENTS

| 3,040,862 | 6/1962 | Schmermund et al. | 198/448 |
| 3,258,104 | 6/1966 | Walkden | 198/490 |
| 3,344,954 | 10/1967 | Peppler et al. | 198/347 |
| 3,747,781 | 7/1973 | Daigle et al. | 198/357 |
| 4,129,205 | 12/1978 | Anderson et al. | 198/448 |

Primary Examiner—Joseph E. Valenza
Attorney, Agent, or Firm—Peter K. Kontler

[57] ABSTRACT

The gaps which develop at times in a file of cigarette packs moving from a packing machine to a processing machine are filled by spare packs stacked in an upright magazine which is adjacent to the conveyor for the file of packs. The lowermost pack of the stack is transferred into an oncoming gap by a pusher which moves the lowermost pack in as well as transversely of the direction of movement of packs in the file. The last stage of transfer includes gravitational descent of the spare pack into the corresponding gap.

9 Claims, 3 Drawing Figures

U.S. Patent    Jan. 6, 1981    4,243,135
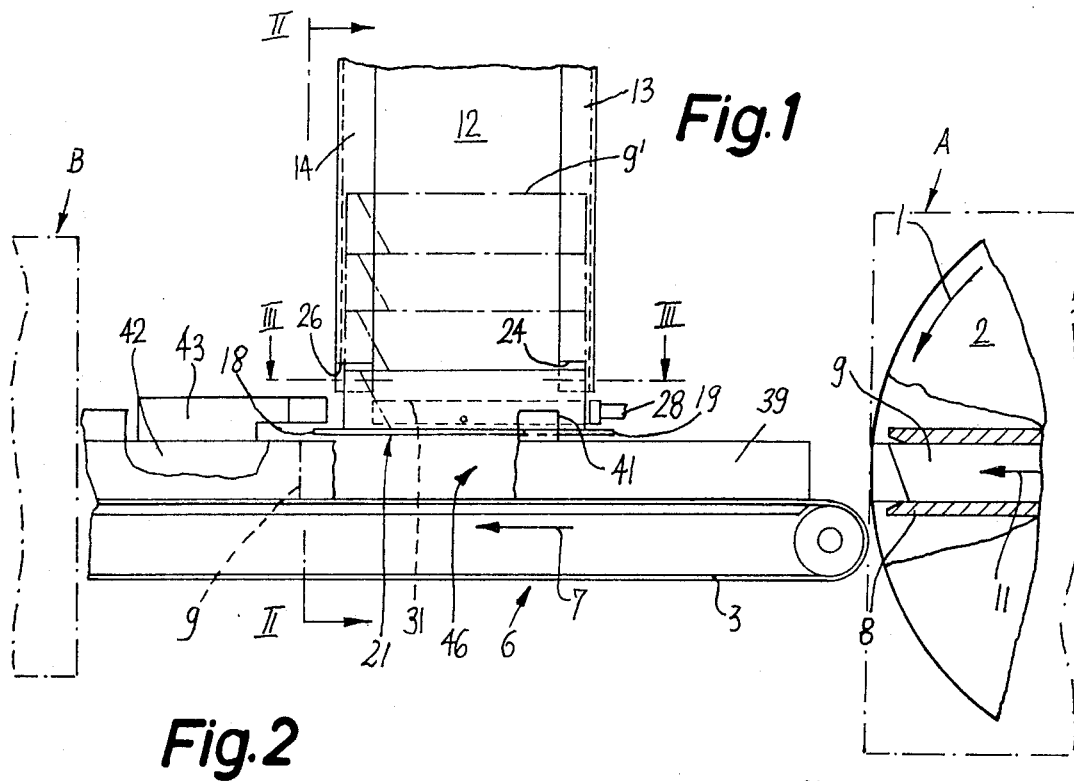
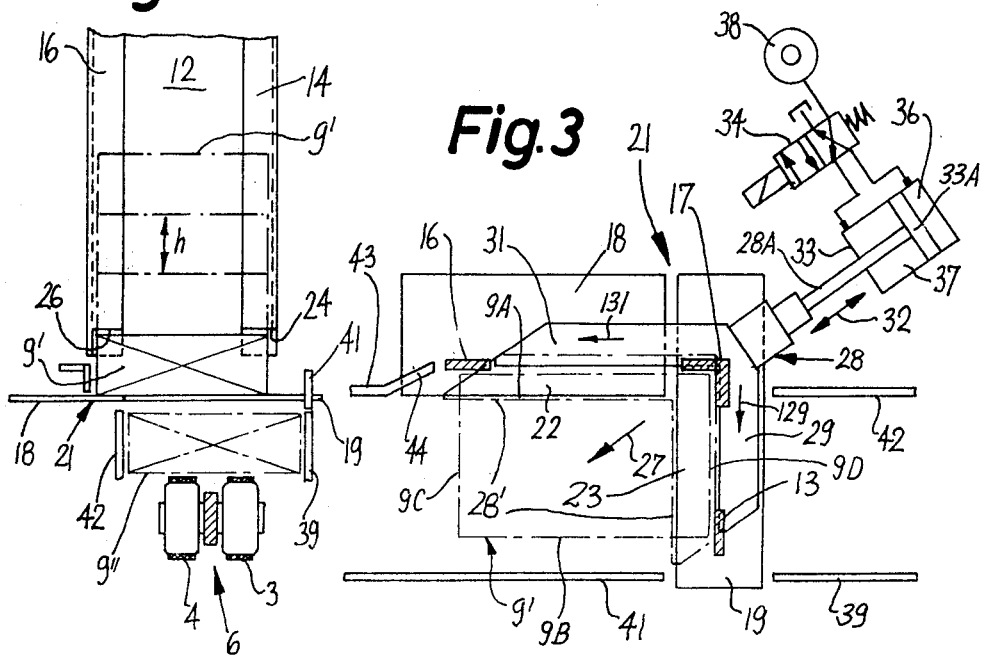

APPARATUS FOR INSERTING PACKS INTO THE GAPS OF A MOVING FILE OF CIGARETTE PACKS OR THE LIKE

BACKGROUND OF THE INVENTION

The present invention relates to apparatus for manipulating substantially block-shaped commodities, such as cigarette packs or packs containing other smokers' products. More particularly, the invention relates to improvements in apparatus for filling gaps which develop at times in a continuous file or stream of commodities (hereinafter referred to as cigarette packs or packs) which are transported between a supplying machine and a processing or consuming machine.

Cigarette packs which are formed in a packing machine (e.g., in a machine of the type known as COM-PASS produced by Hauni-Werke Körber & Co. KG., Hamburg, Federal Republic Germany) are transported to one or more further processing machines, for example, to a machine which applies revenue labels across the narrow front side faces of successive packs. As a rule, cigarette packs which issue from the packing machine form a single file of equally spaced or abutting packs which move lengthwise or sideways on toward the labelling station. For example, such single file or stream of cigarette packs can be transported by the horizontal upper reaches of two parallel belts defining a straight path along which the packs move sideways toward the labelling machine. In many instances, the file of packs exhibits gaps which develop as a result of removal of certain packs, e.g., because defective packs are expelled from the file before or immediately after they reach the aforementioned conveyor. The resulting gaps must be filled by admission of spare packs because many processing machines can operate properly only if they receive an uninterrupted stream or file of contiguous or equally spaced cigarette packs. Thus, many labelling machines will operate properly only if a row consisting of a predetermined number of packs is piled up immediately upstream of the labelling station.

The situation is analogous when a file of cigarette packs is fed to a carton filling machine which accumulates the oncoming packs into stacks and introduces one or more stacks into discrete containers, e.g., cartons consisting of cardboard or the like. The presence of a gap in the file of cigarette packs approaching the carton filling machine can result in accumulation of stacks containing less than the necessary number of packs so that the corresponding cartons must be ejected and their contents removed prior to reintroduction into the carton filling machine.

Gaps in a file of cigarette packs are also likely to develop at stations where successive packs of a series are transferred from a preceding conveyor onto the next-following conveyor. Therefore, the path along which the file of packs advances is monitored by photocells, mechanical sensors or other suitable detectors which transmit signals on detection of a gap, and such signals are used to effect the introduction of a spare pack into each gap ahead of the next-following (processing or consuming) machine.

U.S. Pat. No. 3,040,862 discloses an apparatus wherein a magazine for spare packs is adjacent to the conveyor for a single file of cigarette packs. A slide is employed to push a spare pack from the magazine onto the conveyor so that the spare pack expels a defective pack. The slide is movable at right angles to the direction of movement of the file of packs. In another embodiment, a defective pack is left on a platform and is expelled from the platform by the next-following satisfactory pack.

U.S. Pat. No. 3,342,350 discloses an intermittently operated conveyor for stepwise transport of packs from a supplying station, past several intermediate stations, and on to a receiving station. Vertical magazines above the intermediate stations serve for temporary storage of surplus packs or for delivery of packs to the conveyor. The packs which enter the supplying station are delivered to the conveyor by a first reciprocating pusher, and the packs leaving the receiving station are removed from the conveyor by a second reciprocating pusher.

A drawback which is common to both patented apparatus is that the pushers must perform relatively long strokes. The same applies for the transfer of packs from the magazine or magazines onto the conveyor or vice versa. Therefore, the output of such apparatus is relatively low. Furthermore, the patented apparatus are quite complex and expensive. The stations where spare packs enter the conveyor constitute bottlenecks and, therefore, such apparatus are not suited for transport of continuous files or streams of packs between a high-speed producing machine and a consuming machine whose output is sufficiently high to enable the consuming machine to accept all packs which issue from a modern packer or the like. In fact, the speed of modern cigarette packing machines and of machines which process packs issuing from packing machines is on the increase so that there exists an urgent need for apparatus which can adequately link such machines and insure the transport of a continuous file of equally spaced or contiguous packs.

OBJECTS AND SUMMARY OF THE INVENTION

An object of the invention is to provide a compact, simple and inexpensive but reliable apparatus which can insure the establishment of a continuous file or stream of moving block-shaped commodities and which can automatically insert spare commodities into gaps developing at times in the moving file or stream while the latter is transported at a high speed, either continuously or stepwise.

Another object of the invention is to provide the apparatus with novel and improved means for introducing spare commodities into the gaps which develop, at random intervals, in a rapidly advancing file or stream of cigarette packs or the like.

A further object of the invention is to provide the apparatus with a novel and improved facility for temporary storage of spare commodities.

An additional object of the invention is to provide the apparatus with novel and improved means for effecting the transfer of a spare commodity into an oncoming gap within an extremely short interval of time and in such a way that the orientation of the neighboring satisfactory commodity or commodities is not changed during or as a result of admission of spare commodities.

The invention is embodied in an apparatus for filling gaps which develop at times (normally at random intervals) in a file of cigarette packs or like substantially block-shaped commodities which advance from a supplying machine to a processing machine, e.g., from a cigarette packing machine to a machine which applies revenue labels to each of a series of successive packs issuing from the packing machine.

The apparatus comprises a conveyor defining an elongated first path along which the file of commodities advances between the supplying and processing machines in a predetermined direction (such conveyor may comprise two endless parallel belts having horizontal or substantially horizontal upper reaches which transport the file of commodities along a straight path), a magazine which is adjacent to one side of the first path and serves to store a supply (e.g., an upright stack) of spare commodities including a foremost spare commodity (such foremost commodity is the lowermost commodity if the spare commodities form a stack of superimposed spare commodities), and means for transferring the foremost commodity of the supply into an oncoming gap of the file in the first path. The transferring means comprises a device (e.g., a reciprocable pusher) which is movable along a second path making an acute angle with the first path and including the location of the foremost spare commodity so that the foremost spare commodity which is transferred from the magazine into the first path has a first component of movement in the aforementioned direction and a second component of movement transversely of such direction. Thus, a spare commodity which is in the process of entering a gap moves in as well as at right angles to the direction of movement of the file. The extent to which the magazine is laterally offset with respect to the first path preferably equals the length of the second component of movement of the foremost spare commodity.

The magazine preferably maintains the foremost spare commodity at a level slightly above the first path so that the foremost commodity descends during the last stage of entry into the oncoming gap. To this end, the magazine may comprise a bottom wall with two narrow ledges which support two mutually inclined marginal portions of the underside of the foremost spare commodity.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a side elevational view of an apparatus which embodies the invention, a gap in the file of cigarette packs on the conveyor being shown in the range of the transferring means;

FIG. 2 is a schematic transverse vertical sectional view as seen in the direction of arrows from the line II—II of FIG. 1; and FIG. 3 is a schematic horizontal sectional view as seen in the direction of arrows from the line III—III of FIG. 1.

DESCRIPTION OF THE PREFERRED EMBODIMENTS

The drawing shows an apparatus which transports a file or stream of cigarette packs or analogous block-shaped commodities (e.g., packs of cigarillos or cigars) from a supplying machine A to a processing or consuming machine B. The supplying machine A comprises or is followed by an intermittently indexed drum 2 which is rotated in the direction of arrow 1 and has radially extending pockets or sockets 8 for discrete cigarette packs 9. During each interval of idleness of the drum 2, a plunger or a like transfer element (not shown) expels a pack 9 from the corresponding pocket 8 in the direction of arrow 11 whereby such pack advances onto the horizontal or nearly horizontal upper reaches of two parallel endless flexible belts 3 and 4 constituting a conveyor 6 which advances a continuous file or stream of packs 9 along a horizontal path and in the direction which is indicated by arrow 7. For example, the supplying machine A may constitute a packer wherein groups of cigarettes are confined in inner and outer envelopes. The processing or consuming machine B may constitute a labelling machine wherein the front side faces or end faces 9C of successive packs 9 are provided with revenue labels in a manner not forming part of the present invention. The means for continuously driving the conveyor 6 so that the upper reaches of the belts 3 and 4 advance in the direction of arrow 7 is not shown in the drawing. The packs 9 of the file on the conveyor 6 may but need not contact each other. They are invariably equidistant from each other except when the file develops a gap 46 for reasons which were explained hereinbefore. Two or more gaps may immediately follow each other, or two successive gaps may be separated from each other by one or more packs 9. The machine B should receive a continuous file of equidistant packs 9 (the distance between two neighboring packs may be zero or in excess of zero).

The apparatus further comprises a vertical magazine 12 for a supply or stack of spare packs 9'. It is assumed that spare packs 9' are stacked in the magazine 12 by hand. For example, such spare packs 9' will be obtained by removing the contents of partly filled cartons, not shown. The lower end of the magazine 12 is adjacent but laterally offset with respect to the path which is defined by the upper reaches of the belts 3 and 4. Such lower end is disposed at a level slightly above the top surfaces of packs 9 which form the file or stream on the conveyor 6. The distance between the lower end of the magazine 12 and the upper reaches of the belts 3 and 4 exceeds only slightly the height h of a pack 9 or 9'.

The magazine 12 comprises four upright posts 13, 14, 16 and 17 whose legs surround the corners of the stack of packs 9'. The posts 13, 14, 16 and 17 guide the packs 9' during downward movement toward a bottom wall or support 21 of the magazine 12. As shown in FIG. 3, at least the post 17 may constitute an angle iron whose flanges are adjacent to the respective sides of the stack of packs 9'. If desired, the open spaces between neighboring posts can be closed, either completely or in part, by panels, braces, rungs or the like.

The bottom wall 21 of the magazine 12 comprises two relatively narrow plate-like ledges 18 and 19 which respectively extend in and transversely of the direction indicated by arrow 7. Portions of these ledges extend below the interior of the magazine 12 (see FIG. 3) so that their upper sides provide supports for the corresponding marginal portions of the underside of the lowermost or foremost spare pack 9', i.e., for that spare pack which is nearest to the path for the file of packs 9 on the conveyor 6. The level of the ledges 18 and 19 determines the distance (h+) through which the lowermost spare pack 9' must descend in order to enter an oncoming gap 46. The ledge 18 is adjacent to one side of the path for the packs 9 but is located above such path.

The lower portion of the magazine 12 is open opposite the ledges 18 and 19. The ledge 19 extends transversely of the conveyor 6 at a level below the posts 13 and 17, i.e., at the rear side of the magazine 12, as considered in the direction of arrow 7.

Those portions of the upper sides of ledges 18 and 19 which extend below the interior of the magazine 12 and support the underside of the lowermost spare pack 9' are respectively shown at 22 and 23. The portion 22 is located inwardly of the posts 16 and 17, and the portion 23 is located inwardly of the posts 13 and 17. The combined area of portions 22 and 23 is sufficiently large to prevent unintentional changes in orientation (especially tilting or overturning) of the lowermost pack 9' and/or other spare packs of the stack in the magazine 12. The orientation of spare packs 9' is preferably identical with the orientation of packs 9 on the conveyor 6. As shown in FIG. 3, each pack 9 or 9' has two longer side surfaces 9A and 9B which are parallel to the upper reaches of the belts 3, 4 and two shorter side surfaces or end faces 9C, 9D which are normal to the direction indicated by arrow 7. The height h of packs 9 or 9' is measured vertically, i.e., transversely of the surface 9A, 9B, 9C or 9D.

The lowermost spare pack 9' which rests on the ledges 18, 19 of the bottom wall 21 abuts against the lower portions of posts 13, 16 and 17. The inner sides of these posts are normal to the upper sides of the ledges 18 and 19. The side surfaces 9B and 9C of the lowermost pack 9' are exposed because the lowermost portion of the magazine 12 (above the ledges 18, 19) is open in the direction of the arrow 7 and downwardly, as viewed in FIG. 3. To this end, the lower portion of the post 14 terminates at a level above the lowermost spare pack 9' and parts of the lower portions of posts 13 and 16 have cutouts 24 and 26 at the level of the lowermost spare pack 9'. Thus, only the spare packs 9' above the foremost or lowermost spare pack are confined between all four posts 13, 14, 16 and 17. The lowermost part of the post 17 does not extend all the way to the bottom wall 21; this bottom wall can be fixedly (either permanently or removably) secured to the lower end portion of the post 16.

In accordance with a feature of the invention, the apparatus further comprises means for transferring the lowermost spare pack 9' from the bottom wall 21 of the magazine 12 into an oncoming gap 46 of the file of packs 9 on the conveyor 6. The transferring means comprises a device, here shown as a pusher 28 reciprocable in directions indicated by arrow 32, i.e., at an acute angle to the direction of arrow 7, which can enter the magazine 12 below the post 17 but above the ledges 18, 19 of the bottom wall 21. As indicated by the arrow 27, the pusher 28 moves substantially diagonally of the lowermost spare pack 9' when it performs a forward stroke to thereby transfer such pack into the oncoming gap 46 of the file of packs 9.

The pusher 28 has two portions in the form of arms or branches 29 and 31 which are respectively normal and parallel to the direction indicated by the arrow 7. These arms respectively engage the rear end surface 9D and the side surface 9A of the lowermost spare pack 9' when the pusher 28 performs a forward stroke (arrow 27). Consequently, such lowermost spare pack 9' has a component of movement in the direction of arrow 7 to move off the rear ledge 19 and a component of movement at right angles to the direction of arrow 7 to move off the ledge 18. The two components are respectively indicated by arrows 129 and 131. The length of the component 129 (i.e., the extent of movement of the lowermost spare pack 9' at right angles to the direction of arrow 7) equals the extent to which the magazine 12 is laterally offset with respect to the elongated path which is defined by the belts 3, 4 of the conveyor 6. In the illustrated embodiment, the path along which the pusher 28 moves in or counter to the direction of arrow 27 is such that the lowermost spare pack 9' is engaged at its upper right-hand corner (as viewed in FIG. 3) as well as along the side surface 9A and rear end surface 9D. In other words, the axis of the piston rod 28A which reciprocates the pusher 28 intersects the nearest corner of the lowermost spare pack 9' in the magazine 12.

The means for reciprocating the pusher 28 comprises the aforementioned piston rod 28A which is connected to a piston 33A in a double-acting hydraulic or pneumatic cylinder 33. The flow of a pressurized fluid (e.g., compressed air) from a source 38 into the chamber 16 or 37 and simultaneous flow of fluid from the chamber 37 or 36 is controlled by a solenoid-operated 4/2-way valve 34 which receives signals from the customary detector means (not shown) for monitoring the file of packs 9 for the presence of gaps 46. Such signals determine the timing of forward strokes of the pusher 28 to insure that, when expelled from the magazine 12, the lowermost spare pack 9' invariably enters a gap 46 without changing the orientation of neighboring packs 9. The pusher 28 performs a forward stroke (arrow 27) in response to admission of pressurized fluid into the chamber 36 while the chamber 37 communicates with the atmosphere or with a tank, depending on the nature of fluid. The forward stroke is immediately followed by a return stroke of the pusher 28; the chamber 37 then receives pressurized fluid while the valve 34 permits evacuation of fluid from the chamber 36.

The apparatus further comprises guide means to insure that the orientation of a freshly expelled spare pack 9' does not change during gravitational descent which constitutes the last stage of transfer of such spare pack into the respective gap 46 and begins when the pusher 28 has caused the pack to slide off the portions 22, 23 of the upper sides of the ledges 18, 19 forming part of the bottom wall 21. The guide means comprises two parallel walls 39, 42 which flank the path of packs 9 at the transfer station for spare packs 9' and two parallel walls 41, 43 which are respectively disposed above the walls 39, 42. The wall 41 can be said to constitute a stop which limits the extent of movement of a spare pack 9' transversely of the conveyor 6. The wall 43 has an outwardly inclined front end portion or cam 44 which steers a spare pack 9' toward the inner side of the major portion of the wall 43. The walls 39, 42 are located at a level below and the walls 41, 43 are located at a level above the ledges 18, 19 of the bottom wall 21. The purpose of the guide means is to intercept and properly steer a spare pack 9' into the oncoming gap 46 when the forward stroke of the pusher 28 is abrupt, i.e., when the lowermost spare pack 9' would be likely to advance beyond the optimum position for descent onto the conveyor 6. The cam 44 can change the orientation of a slightly turned or misoriented pack 9' during travel to a position of register with the respective gap 46.

FIG. 1 shows a gap 46 which travels past the magazine 12. The device for detecting this gap may include a photocell, a mechanical sensor or another monitoring means which can be installed immediately ahead of the transfer station. Alternatively, a suitable detector can be installed in the supplying machine A to monitor the pockets 8 for the presence or absence of packs 9 and to transmit a signal (which is delayed) to the valve 34 in response to detection of an empty pocket. The valve 34 admits fluid into the chamber 36 and permits evacuation of fluid from the chamber 37 whereby the pusher 28 performs a forward stroke (arrow 27) and transfers the lowermost spare pack 9' from the magazine 12 into the space between the walls 41, 43 of the guide means. The extended position of the pusher 28 is shown by phantom lines, as at 28'.

During movement of the pusher 28 to the extended position 28', the underside of the lowermost spare pack 9' abruptly slides off the portions 22, 23 of the upper sides of ledges 18, 19 and thereupon descends without any (or with negligible) change of orientation to enter the adjacent gap 46. The guide means 39 and 41–44 further reduce the likelihood of misorientation or correct the orientation of the spare pack 9' which is about to descend onto the conveyor 6. A properly inserted spare pack 9" is shown in FIG. 2.

The pusher 28 is retracted to the solid-like position of FIG. 3 immediately after it reaches the extended position 28' so that the next spare pack 9' can descend onto the ledges 18, 19 of the bottom wall 21. The likelihood that a spare pack 9' would change its position during movement in the magazine 12 toward and onto the ledges 18, 19 is reduced by the spare packs thereabove. Furthermore, such upper spare packs invariably prevent changes in orientation (especially tilting) of the lowermost spare pack 9' which already rests on the ledges 18, 19. Such tilting could be caused by vibrations of the machine A and/or B, conveyor 6 and/or magazine 12. In order to further reduce the likelihood of misalignment of the lowermost spare pack 9' prior to transfer onto the conveyor 6, the apparatus may comprise a suitable level detector (not shown) which monitors the height of the stack in the magazine 12 and produces a visible, audible and/or otherwise detectable signal when the height of the stack is too low. Such signal informs the attendant that the supply of spare packs in the magazine 12 must be replenished.

An important advantage of the improved apparatus is that the pusher 28 must perform short forward and return strokes because the lowermost spare pack 9' in the magazine 12 is only slightly out of register with the packs 9 of the file on the conveyor 6. Thus, the length of the forward or return stroke of the pusher 28 can be considerably less than the distance between the side surfaces 9A and 9B of a pack 9 or 9'. Also, the length of the component 129 is only a small fraction of the just mentioned distance. Such short strokes of the pusher 28 are desirable in order to insure that the pusher can transfer spare packs 9' into two or more immediately following or closely adjacent gaps 46. Moreover, the transfer of packs 9' into several closely adjacent gaps 46 can be effected while the conveyor 6 is driven at a high speed and without any reduction of such speed.

The pusher 28 can be reciprocated along a path which is parallel to a diagonal of the lowermost spare pack 9' in the magazine 12. The arms 29, 31 reduce the likelihood of misorientation or correct the orientation of a spare pack 9' which is being moved in the directions indicated by arrows 129 and 131.

Another important advantage of the improved apparatus is that its space requirements are minimal. Thus, the magazine 12 can be installed (in or on the frame of the machine A or B, or on a separate frame) almost directly above the conveyor 6, and the means for reciprocating the pusher 28 extends only slightly beyond one side of the conveyor. The pusher 28 can respond to signals from an immediately adjacent detector because the foremost spare pack 9' invariably rests on the ledges 18, 19 when the pusher performs a forward stroke, i.e., the movement of the pusher to the extended position 28' need not be delayed in order to allow the adjacent pack 9' to descend in the magazine 12 prior to admission of pressurized fluid into the chamber 36 of the cylinder 33.

The feature that the underside of the lowermost spare pack 9' rests on relatively small portions 22, 23 of the upper sides of ledges 18, 19 insures that the pusher 28 must overcome negligible friction between the lowermost spare pack and the bottom wall 21 during movement to the extended position 28'. Moreover, the inertia of the spare pack 9', which is abruptly deprived of its support on the ledges 18 and 19 during the initial stage of movement of pusher 28 to the position 28', is low so that the pack 9' begins to descend immediately after it is pushed off the bottom wall 21. This also reduces the likelihood of tilting or another undesirable change in orientation of the lowermost spare pack. As mentioned above, the likelihood of misorientation of the just discussed pack is further reduced due to the fact that the distance between the bottom wall 21 and the upper reaches of belts 3, 4 only slightly exceeds the height h of a pack 9 or 9'. The walls 39, 41–43 of the guide means prevent a pack 9' in front of the advancing pusher 28 from being propelled beyond the optimum position for descent into the adjacent gap 46. This holds true even if the pusher 28 moves forwardly at an elevated speed. The speed of the pusher 28 during movement toward the extended position 28' can be selected in dependency on the speed of the conveyor 6 and on the length of packs 9 or 9' (as considered in the direction of arrow 7).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. Apparatus for filling gaps which develop at times in a file of cigarette packs or like block-shaped commodities having a predetermined width and a predetermined length and advancing from a supplying to a processing machine, comprising a conveyor defining an elongated first path along which said file of commodities moves between said machines in a predetermined direction; a magazine adjacent to one side of and partly overlying said path, said magazine being arranged to store a supply of superimposed spare commodities including a lowermost commodity and said magazine including a support for the lowermost commodity, said support being disposed at a level at least slightly above said path and supporting the lowermost commodity for movement to a position of registry with successive commodities as well as with successive gaps in said path; and means for transferring the lowermost commodity from said magazine to said position whence such lowermost commodity can descend by gravity into an oncoming gap of the file in said path, including a device movable along a second path making an acute angle with said first path so that the lowermost spare commodity which is transferred from said magazine to said position preparatory to descending into said first path has a first component of movement along said support in said direction and a second component of movement along said support at right angles to said direction, the distances covered by the lowermost spare commodity on its way from said magazine to said position of register with a gap therebelow in and at right angles to said direction being respectively less than said predetermined length and width.

2. Apparatus as defined in claim 1 for filling the gaps in a file wherein each commodity has a first pair of side surfaces substantially parallel with and a second pair of side surfaces normal to said direction and wherein the orientation of the lowermost spare commodity in said magazine is similar to that of the commodities in said first path, said second path extending substantially diagonally of said lowermost commodity.

3. Apparatus as defined in claim 2, wherein said device comprises a pusher having two portions one of which is parallel with and the other of which is normal to said direction, said one portion engaging one of said first pair of side surfaces and said other portion engaging one of said second pair of side surfaces of the lowermost spare commodity during transfer of such commodity from said magazine to said predetermined position.

4. Apparatus as defined in claim 1, wherein said supply forms a stack of spare commodities in said magazine.

5. Apparatus as defined in claim 1, wherein said magazine is laterally offset with respect to said conveyor by a distance corresponding to the length of said second component.

6. Apparatus as defined in claim 5, wherein said magazine has a first open side facing said first path and a second open side facing in said direction, said open sides being disposed at the level of the lowermost commodity of said stack.

7. Apparatus as defined in claim 1, wherein said support comprises two ledges extending substantially at right angles to each other and each underlying a relatively narrow marginal portion of the underside of the lowermost commodity of said stack.

8. Apparatus as defined in claim 1 for filling the gaps in a file of commodities having a predetermined height, wherein said support is located at a level above said conveyor and at a distance from said conveyor which slightly exceeds said predetermined height.

9. Apparatus as defined in claim 8, further comprising guide means flanking said first path in the region of transfer of spare commodities onto said conveyor.

* * * * *